(12) United States Patent
Cormode et al.

(10) Patent No.: US 8,538,938 B2
(45) Date of Patent: Sep. 17, 2013

(54) INTERACTIVE PROOF TO VALIDATE OUTSOURCED DATA STREAM PROCESSING

(75) Inventors: Graham Cormode, Morristown, NJ (US); Ke Yi, Clear Water Bay (HK)

(73) Assignee: AT&T Intellectual Property I, L.P., Atlanta, GA (US)

(*) Notice: Subject to any disclaimer, the term of this patent is extended or adjusted under 35 U.S.C. 154(b) by 371 days.

(21) Appl. No.: 12/959,063

(22) Filed: Dec. 2, 2010

(65) Prior Publication Data

US 2012/0143830 A1 Jun. 7, 2012

(51) Int. Cl.
G06F 7/00 (2006.01)
G06F 17/00 (2006.01)
G06F 17/30 (2006.01)
G06F 7/04 (2006.01)

(52) U.S. Cl.
USPC .............................. 707/698; 707/797; 726/30

(58) Field of Classification Search
USPC .............................. 707/698, 797; 726/22, 30
See application file for complete search history.

(56) References Cited

U.S. PATENT DOCUMENTS

| | | | | |
|---|---|---|---|---|
| 4,309,569 A | * | 1/1982 | Merkle | 713/177 |
| 4,881,264 A | * | 11/1989 | Merkle | 713/177 |
| 6,151,676 A | * | 11/2000 | Cuccia et al. | 713/176 |
| 7,165,246 B2 | | 1/2007 | de Jong | |
| 7,450,032 B1 | | 11/2008 | Cormode et al. | |
| 7,584,223 B1 | * | 9/2009 | Pinkas et al. | 1/1 |
| 7,584,396 B1 | | 9/2009 | Cormode et al. | |
| 7,590,657 B1 | | 9/2009 | Cormode et al. | |
| 7,657,503 B1 | | 2/2010 | Cormode et al. | |
| 7,668,205 B2 | | 2/2010 | Putnam | |
| 7,742,424 B2 | | 6/2010 | Cormode et al. | |
| 7,743,145 B2 | | 6/2010 | Kaler | |
| 7,756,805 B2 | | 7/2010 | Cormode et al. | |
| 7,783,647 B2 | | 8/2010 | Cormode et al. | |
| 7,864,077 B2 | | 1/2011 | Cormode et al. | |
| 7,885,911 B2 | | 2/2011 | Cormode et al. | |
| 7,979,711 B2 | * | 7/2011 | Chen et al. | 713/176 |
| 8,112,802 B2 | * | 2/2012 | Hadjieleftheriou et al. | |
| 8,256,015 B2 | * | 8/2012 | Gentry et al. | 726/30 |
| 8,316,417 B2 | * | 11/2012 | Di Battista et al. | 726/2 |
| 2004/0128392 A1 | | 7/2004 | Blakley, III et al. | |
| 2005/0131946 A1 | | 6/2005 | Korn et al. | |
| 2005/0281404 A1 | | 12/2005 | Yu | |

(Continued)

OTHER PUBLICATIONS

Chakrabarti et al., Annotations in Data Streams, ICALP 2009, Part I, LNCS 5555, pp. 222-234, published 2009.*

(Continued)

*Primary Examiner* — Jeffrey A Burke
(74) *Attorney, Agent, or Firm* — Scott P. Zimmerman, PLLC

(57) ABSTRACT

A method for validating outsourced processing of a data stream arriving at a streaming data warehouse of a data service provider includes a proof protocol. A verifier acting on behalf of a data owner of the data stream may interact with a prover acting on behalf of the data service provider. The verifier may calculate a first root hash value of a binary tree during single-pass processing of the original data stream with limited computational effort. A second root hash value may be calculated using the proof protocol between the verifier and the prover. The prover is requested to provide certain queried values before receiving random numbers used to generate subsequent responses dependent on the provided values. The proof protocol may be used to validate the data processing performed by the data service provider.

17 Claims, 7 Drawing Sheets

(56) References Cited

U.S. PATENT DOCUMENTS

| | | |
|---|---|---|
| 2006/0224609 A1 | 10/2006 | Cormode et al. |
| 2007/0136285 A1 | 6/2007 | Cormode et al. |
| 2007/0237410 A1 | 10/2007 | Cormode et al. |
| 2007/0240061 A1 | 10/2007 | Cormode et al. |
| 2007/0286071 A1 | 12/2007 | Cormode et al. |
| 2008/0095360 A1* | 4/2008 | Vuillaume et al. ............. 380/44 |
| 2008/0195583 A1* | 8/2008 | Hsu et al. ......................... 707/3 |
| 2008/0270372 A1* | 10/2008 | Hsu et al. ......................... 707/4 |
| 2009/0041253 A1* | 2/2009 | Chen et al. .................. 380/282 |
| 2009/0083418 A1 | 3/2009 | Krishnamurthy et al. |
| 2009/0132561 A1 | 5/2009 | Cormode et al. |
| 2009/0153379 A1 | 6/2009 | Cormode et al. |
| 2009/0172058 A1 | 7/2009 | Cormode et al. |
| 2009/0172059 A1 | 7/2009 | Cormode et al. |
| 2009/0292726 A1 | 11/2009 | Cormode et al. |
| 2010/0043057 A1* | 2/2010 | Di Battista et al. ............... 726/2 |
| 2010/0114989 A1 | 5/2010 | Cormode et al. |
| 2010/0132036 A1 | 5/2010 | Hadjieleftheriou et al. |
| 2010/0153064 A1 | 6/2010 | Cormode et al. |
| 2010/0153328 A1 | 6/2010 | Cormode et al. |
| 2010/0153379 A1 | 6/2010 | Cormode et al. |
| 2010/0212017 A1* | 8/2010 | Li et al. ........................... 726/26 |
| 2010/0235362 A1 | 9/2010 | Cormode et al. |
| 2010/0268719 A1 | 10/2010 | Cormode et al. |
| 2010/0312872 A1 | 12/2010 | Cormode et al. |
| 2010/0318438 A1 | 12/2010 | Cormode et al. |
| 2011/0041184 A1 | 2/2011 | Cormode et al. |
| 2011/0066600 A1 | 3/2011 | Cormode et al. |
| 2011/0138264 A1 | 6/2011 | Cormode et al. |
| 2011/0145223 A1 | 6/2011 | Cormode et al. |
| 2012/0030468 A1* | 2/2012 | Papamanthou et al. ....... 713/171 |
| 2012/0110336 A1* | 5/2012 | Frey et al. ..................... 713/181 |

OTHER PUBLICATIONS

Yi et al., Small Synopses for Group-by Query Verification on Outsourced Data Streams, ACM Transactions on Database Systems, vol. 34, No. 3, Article 15, Published Aug. 2009.*

Li et al., Authenticated Index Structures for Outsourced Databases, Handbook of Database Security, published 2008.*

Erway et al., Dynamic Provable Data Possession, CCS'09, published Oct. 2009.*

* cited by examiner

INTERACTIVE PROOF TO VALIDATE OUTSOURCED DATA STREAM PROCESSING

FIELD OF THE DISCLOSURE

The present disclosure relates to outsourced data stream processing and, specifically, to validating outsourced data stream processing using an interactive proof.

BACKGROUND

Data processing involved with streaming data warehouses may involve processing operations on an arriving data stream. The data processing may be associated with a heavy infrastructure burden to handle large-volume data streams. An owner of the data stream may accordingly choose to outsource the data processing to a data service provider. The data stream owner may desire validation that the data service provider has correctly performed processing operations on the outsourced data stream.

DETAILED DESCRIPTION

Figure 1:
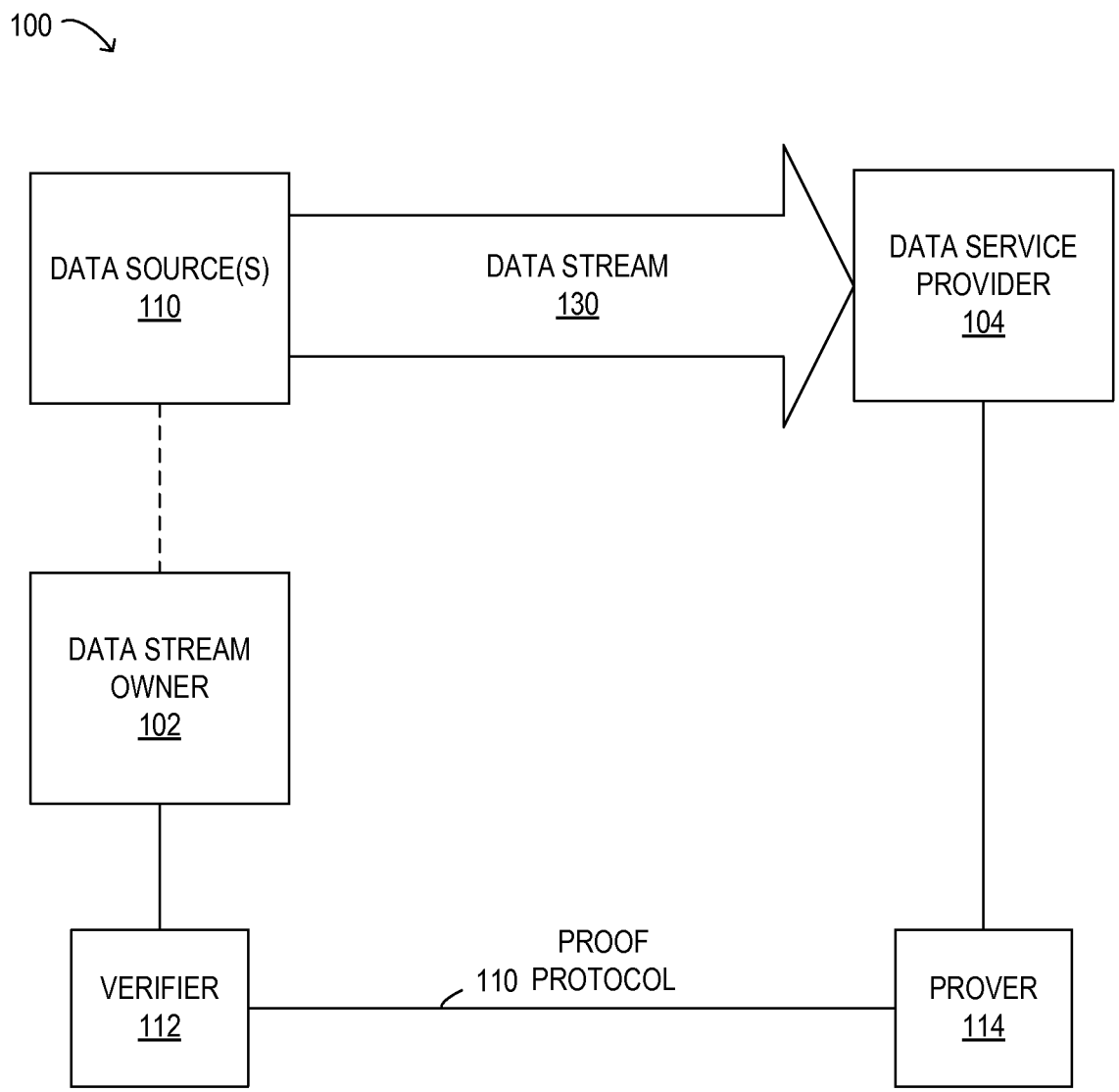
FIG. 1 is a block diagram of selected elements of a streaming data processing system.

In a first aspect, disclosed methods, systems, devices, and software enable validating outsourced processing of a data stream arriving at a streaming data warehouse of a data service provider. In one embodiment, a verifier acting on behalf of a data owner of the data stream may, using a proof protocol, interact with a prover acting on behalf of the data service provider. The verifier may calculate a first root hash value of a binary tree during single-pass processing of the original data stream. A second root hash value may be calculated using the proof protocol between the verifier and the prover. The prover may be requested to provide certain queried values before receiving random numbers used to generate subsequent responses dependent on the provided values. The proof protocol may be used to validate the data processing performed by the data service provider.

In one aspect, a disclosed method for validating a data stream arriving at a data service provider includes sending a query to a prover associated with the data service provider for a first data block associated with the data stream, and receiving, from the prover, the first data block and a sibling data block. The sibling data block may be a sibling of the first data block in a lowest level of a binary tree of hash values having a number of levels. The method may further include calculating a current hash value using the first data block, the sibling data block, and a first random number. The first random number may be kept confidential with respect to the prover. After calculating the first hash value, the method may further include processing a next level in the binary tree of hash values. The method operation of processing the next level may include a) sending, to the prover, a current random number and a request for a sibling hash value, b) receiving the sibling hash value, c) determining a subsequent random number, and d) calculating a subsequent hash value using the current hash value, the sibling hash value, and the subsequent random number. The subsequent random number may be kept confidential with respect to the prover.

In particular embodiments, the method may further include recursively repeating operations a)-d) for successive levels in the binary tree, using a preceding parent hash value as the current hash value and a new random number as the current random number, until a root hash value for the binary tree is obtained. The number of levels in the binary tree may depend on a number of data sources associated with the data stream. The method operation of sending the query to the prover for the first data block may include sending a query selected from the group of data stream queries consisting of: index, predecessor, dictionary, range, range-sum, self join size, frequency moment, and inner product.

In certain embodiments, the method may further include comparing the obtained root hash value and a previously stored root hash value for a match. When the match is observed, the method may include validating the data stream and that the prover correctly provided the first data block. When the match is not observed, the method may include invalidating the data stream and determining that the prover did not correctly provide at least one value associated with the binary tree. Based on the number of levels in the binary tree, the method may include calculating a root hash value for the data stream arriving at the data service provider, and storing the calculated root hash value.

In another aspect, a disclosed computer system for validating a data stream includes a processor configured to access memory media. The memory media may include instructions executable by the processor to store a first root hash for the data stream, wherein the first root hash includes information for a number of levels in a binary tree, calculate a second root hash for the data stream using a proof protocol and a prover associated with a data service provider receiving the data stream, and determine whether the first root hash matches the second root hash. The proof protocol may represent instructions executable by the processor to perform the following operations: a) receive, from the prover, a first data block in the binary tree and a second data block that is a sibling of the first data block, b) calculate a first hash value using the first data block, the second data block, and a first random number that may be kept confidential with respect to the prover, and c) after calculating the first hash value, calculate a hash value for a next level in the binary tree. Calculating the hash value for the next level may further include processor executable instructions to send, to the prover, a random number used to calculate a previous hash value and a request for a sibling hash value, receive the sibling hash value from the prover, and calculate a parent hash value using the previous hash value, the sibling hash value, and a next random number that may be kept confidential with respect to the prover. The proof protocol may also represent instructions executable by the processor to further recursively execute operation c) above for successive levels in the binary tree, using a preceding parent hash value as the previous hash value and a new random number as the next random number, until the second root hash value for the binary tree is obtained.

In given embodiments, the memory media may further include instructions executable by the processor to validate that the data service provider is accurately processing the data stream when the first root hash matches the second root hash.

When the first root hash does not match the second root hash, the processor executable instructions may be executable to return a fail result for the proof protocol. The number of levels in the binary tree may depend on a number of data sources associated with the data stream, while each data source may contribute a respective data block to the data stream. The proof protocol may further include instructions executable by the processor to send, prior to operation a), a query to the prover for the first data block. The query may include a query selected from the group of data stream queries consisting of: index, predecessor, dictionary, range, range-sum, self join size, frequency moment, and inner product. A hash value may be calculated using values for a sibling pair, along with a random variable R and a prime number P. A range for R and a value for P may be selected based on a desired degree of security for the proof protocol, while a larger range of R and a greater value of P may increase the degree of security.

In yet another aspect, disclosed computer-readable memory media include instructions for validating a data stream arriving at a data service provider. The instructions may be executable to store a first root hash value for the data stream, and calculate a second root hash value for the data stream using a proof protocol and a prover associated with the data service provider. The first root hash value may be derived based on a number of levels in a binary tree. The proof protocol may include instructions executable to perform the following operations: a) receive, from the prover, a first data block in the binary tree and a second data block that is a sibling of the first data block, b) calculate a first hash value using the first data block, the second data block, and a first random number that is kept confidential with respect to the prover, and c) after calculating the first hash value, process a next level in the binary tree. Processing the next level may further include instructions executable to send, to the prover, a random number used to calculate a current hash value, receive a sibling hash value from the prover, and calculate a parent hash value using the current hash value, the sibling hash value, and a next random number that may be kept confidential with respect to the prover. The proof protocol may also include instructions executable to recursively execute operation c) above for successive levels in the binary tree, using a preceding parent hash value as the current hash value and a new random number as the next random number, until the second root hash value for the binary tree is obtained. The memory media may further include instructions executable to determine whether the first root hash value matches the second root hash value.

In some embodiments, the memory media may further include instructions executable to validate that the prover accurately reproduced data blocks associated with the data stream when the first root hash matches the second root hash, and return a fail result for the proof protocol when the first root hash value does not match the second root hash value. The proof protocol may further include instructions executable to send, prior to operation a), an indication of the proof protocol to the prover specifying instructions executable by the prover to respond to the proof protocol.

In particular embodiments, the memory media may still further include instructions executable to generate new random numbers for calculating the first root hash value for respective levels in the binary tree after executing the proof protocol, and record an indication of the random numbers associated with the first root hash value for use in subsequent iterations of the proof protocol.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of streaming data processing system 100. The entities included in streaming data processing system 100 of FIG. 1 may be located at various remote locations, in different embodiments. Specifically, data source(s) 110, data stream owner 102, data service provider 104, verifier 112, and prover 114 may each represent functionality at one or more individual locations that are accessible via suitable network connections. Data stream 130 and/or proof protocol 110 may also represent transmissions over commensurate network connections. It will be understood that FIG. 1 is shown as a simplistic example for clarity, and that various configurations and arrangements of internal entities and data may be implemented in a given instance of streaming data processing system 100.

Streaming data processing system 100 may represent data processing that can be performed using a streaming data warehouse (not explicitly shown in FIG. 1), which generally represents a database storage system, such as a relational database management system. As defined here, a "streaming data warehouse" refers to a type of database system that is configured to handle processing operations while a data stream is arriving. As used herein, "data stream" represents a continuous incoming flow of new data to the streaming data warehouse (see also FIG. 2). A data stream may be comprised of individual "data blocks" that are associated with a respective "data source" that contributes to the data stream. Each data source may send updates to the streaming data warehouse in the form of data blocks, which may represent various amounts, or lengths, of data. A data block may be further divided into other data units, such as bits, bytes, datagrams, network packets, etc. The data blocks in the arriving data stream may arrive in regular or irregular intervals. It is noted that a streaming data warehouse may represent any of a variety of database types, including very large and complex databases, or databases that include components that are physically placed in different locations, also referred to as distributed databases. A streaming data warehouse may be associated, or linked, with a database interface specification (not shown in FIG. 1), or other specification, which may represent a collection of rules, conventions, documentation, and/or other forms of specifying (or describing) a particular logical database.

In FIG. 1, streaming data processing system 100 is shown with data stream owner 102, who may be a responsible entity (i.e., an owner) of data stream 130. Accordingly, data stream owner 102 may also be a responsible entity of data source(s) 110, which provide data blocks (not shown in FIG. 1, see FIG. 2) that feed data stream 130. The association of data stream owner 102 with data source(s) 110, shown as a dashed line in FIG. 1, may thus represent ownership or another level of responsibility that also relates to data stream 130. Although data stream owner 102 desires to have certain data processing operations performed on data stream 130, data stream owner 102 may not desire to purchase, install, and operate a streaming data warehouse (not explicitly shown in FIG. 1) for this purpose, and may instead choose to engage data service provider 104 to perform such tasks. The data processing arrangement depicted in streaming data processing system 100 may be economically advantageous to both data stream owner 102 and data service provider 104. For example, data service provider 104 may be able to provide data processing services on data stream 130 less expensively than data stream owner 102, because data service provider 104 may have attained a greater economy of scale. Thus, in streaming data processing system 100, data service provider 104 may operate a streaming data warehouse (not shown in FIG. 1) with sufficient processing capacity and related resources to handle processing operations on data stream 130. Through association with data source(s) 110, data stream owner 102 may retain a certain level of processing capacity with respect to data stream 130.

In FIG. 1, streaming data processing system 100 includes verifier 112, which may represent an agent or agency that operates to serve data stream owner 102 to validate that desired processing operations on data stream 130 are performed correctly and accurately. In certain embodiments, verifier 112 may itself be an internal organ of data stream owner 102. For such purposes, verifier 112 may also be configured to access data stream 130 with a given level of processing capacity. In order to attain the economic advantages mentioned above, verifier 112 may generally be assumed to have a lower level of processing capacity than data service provider 104. For example, verifier 112 may have single-pass access to data stream 130, such that arriving data blocks (not shown in FIG. 1) of data stream 130 may be received and immediately processed by verifier 112, but are not retained beyond a limited buffering capacity.

Also shown in FIG. 1 is prover 114, which may represent an agent or agency that operates to serve data service provider 104 by communicating with verifier 112 in order to prove that processing operations on data stream 130 are performed correctly. It is noted that, in certain embodiments, prover 114 may itself be an internal organ of data service provider 104. Accordingly, prover 114 may be configured with (or have access to) commensurate processing resources as available to data service provider 104.

As shown in FIG. 1, proof protocol 110 may represent a communicative coupling and/or a logical interaction between verifier 112 and prover 114 for the purposes of validating processing operations on data stream 130 that are performed by data service provider 104 on behalf of data stream owner 102. It is noted that verifier 112 may be in charge of proof protocol 110 and may accordingly determine communication and logical aspects of proof protocol 110, which prover 114 may be assumed to follow and/or respect. Proof protocol 110 may be structured as a series of questions, or queries, sent by verifier 112 to which prover 114 is expected to respond correctly (see also FIG. 3). Based on the responses of prover 114 when implementing proof protocol 110, verifier 112 may be able to validate correct processing of data stream 130. As will be described in further detail herein, proof protocol 110 may represent an implementation of a computationally lightweight, yet secure, method for validating processing operations on data stream 130. Proof protocol 110 may be highly effective despite a potentially large disparity in processing resources and/or capacity available to verifier 112 and prover 114, as mentioned above. It is particularly noted that proof protocol 110 may be designed with a high probability of discovering incorrect processing operations, and a low probability that a prover, even one with substantially unlimited processing resources, could defeat the intended purpose by providing plausible responses without correctly performing processing operations on data stream 130 (i.e., cheat during proof protocol 110).

The queries sent by verifier 112 to prover 114 may be any one or more of a variety of data stream queries that involve obtaining information about data stream 130. Examples of data stream queries that may be requested by verifier 112 include: index queries, predecessor queries, dictionary queries, range queries, range-sum queries, self join size queries, frequency moment queries, and inner product queries, which are defined in more detail below. Such data stream queries, among other queries that may be sent, make proof protocol 110 suitable for a wide variety of possible applications. In the example data stream queries described below, the universe from which all data elements are drawn is defined as $[u]=\{0, \ldots, u-1\}$.

INDEX QUERY: Given a data stream of u elements $b_1, \ldots, b_u$, and an index q, the correct response is $b_q$.

PREDECESSOR QUERY: Given a data stream of n elements in universe [u] and a query $q\in[u]$, the correct response is the largest p in the data stream such that $p \leq q$. It is assumed that 0 appears in [u].

DICTIONARY QUERY: Given a data stream of $n \leq u$ elements of (key, value) pairs, where both the key and the value are drawn from universe [u] and all keys are distinct, and a query $q\in[u]$. When q is one of the keys, the correct response is the value paired with q. When q is not one of the keys, the correct response is "not found".

RANGE QUERY: Given a data stream of n elements in universe [u] and a range query $[q_L, q_R]$, the correct response is the set of all elements in the data stream between $q_L$ and $q_R$ inclusive.

RANGE-SUM QUERY: Given a data stream of $n \leq u$ elements of (key, value) pairs, where both the key and the value are drawn from universe [u] and all keys are distinct, and a range query $[q_L, q_R]$, the correct response is the sum of all values in the data stream between $q_L$ and $q_R$ inclusive.

SELF JOIN SIZE QUERY: Given a data stream of n elements in universe [u], the correct response is the result of the computation $$\sum_{i\in[u]} a_i^2,$$

where $a_i$ is the number or occurrences of i in the data stream. This query may also be referred to as the second frequency moment.

k-th FREQUENCY MOMENT QUERY: Given a data stream of n elements in universe [u], and an integer $k \geq 1$, the correct response is the result of the computation $$\sum_{i\in[u]} a_i^k,$$

where $a_i$ is the number of occurrences of i in the data stream.

INNER PRODUCT (JOIN SIZE) QUERY: Given two data streams A and B in universe [u], having respective frequency vectors $(a_1, \ldots, a_u)$ and $(b_1, \ldots b_u)$, the correct response is the result of the computation $$\sum_{i \in [u]} a_i b_i.$$

Figure 2:
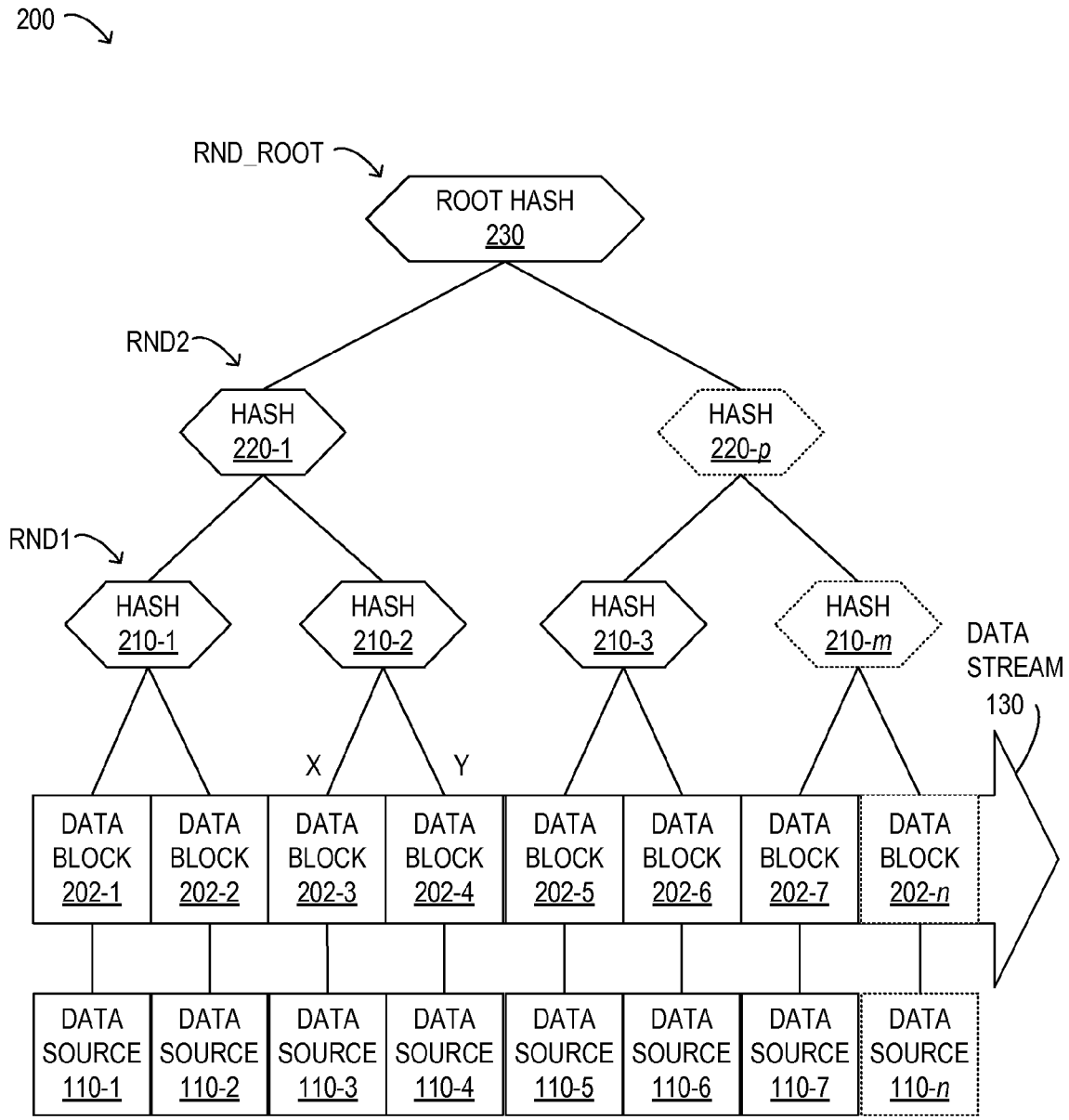
FIG. 2 is a block diagram of selected elements of a binary tree for a data stream.

Referring to FIG. 2, a block diagram of selected elements of an embodiment of binary tree 200 is shown along with additional details of data stream 130 and data sources 110. In the example shown in FIG. 2 (and corresponding protocol in FIG. 3), a fixed number of data sources 110 will be assumed to provide respective data blocks 202 comprising data stream 130. Specifically, data source 110-1 provides data block 202-1, data source 110-2 provides data block 202-2, data source 110-3 provides data block 202-3, data source 110-4 provides data block 202-4, data source 110-5 provides data block 202-5, data source 110-6 provides data block 202-6, data source 110-7 provides data block 202-7, and data source 110-n provides data block 202-n, where n is a number of data sources 110, and in FIG. 2, n=8. It will be understood that in various embodiments, n may be a smaller or larger number. Each data source 110 may provide its respective data block 202 independently of another data source included in data stream 130. Thus, data stream 130 may in actuality be comprised of data blocks 202 arriving from various data sources 110 without any regular or predictable timing or order. However, in a given instantiation of data stream 130 and binary tree 200, a fixed number n of data sources 110 and data blocks 202 shall be assumed.

It is noted that one example of data sources 110 contributing to data stream 130, as shown in FIG. 2, may be a telecommunications network monitoring system, in which each data source 110 represents a network node (i.e., a router or a gateway, etc.) that broadcasts a status message represented by data block 202. The status message may include performance indications for the network. During periods of network error, such as network overloads, the number of status messages may increase dramatically for certain network nodes. For a telecommunications network provider, timely and accurate processing of data stream 130 may thus represent a critical operational aspect to maintaining network performance.

In FIG. 2, data blocks 202 may represent a first level of binary tree 200, which may have a varying number of levels according to a number n of data sources 110, as described above. Each element (or "leaf") in binary tree 200, except for a top level (represented in FIG. 2 by root hash 230), is associated with a "sibling element" (or "sibling leaf" or simply "sibling"), which together form a "sibling pair" of elements. Values for sibling pairs are referred to herein as "X" and "Y" values. Except for the first level of binary tree 200 (i.e., data blocks 202), each element in a given level of binary tree 200 is also a "parent element" (or "parent leaf" or simply "parent") of a sibling pair of "child elements" (or "child leaves" or simply "children"). A parent element may also be referred to as a "hash" or "hash value" of the value of its sibling pair of children X and Y. As will be used herein, a hash value for a sibling pair X and Y is given by:

(X+R*Y) modulo P        Equation [1], where R is a random number and P is a prime number. It will be appreciated that Equation 1 will result in values in the range of (0, P−1). As the values for P and R are increased, a level of security associated with the resulting hash value given by Equation 1 will also increase, since the likelihood that a given hash value could be guessed or could result from a different value in Equation 1 will decrease. The random number R is the same for a given level of binary tree 200. In FIG. 2, RND1 represents a first random number used for a second level in binary tree 200, RND2 represents a second random number used for a third level in binary tree 200, and RND_ROOT represents a third random number used for a fourth level, or root level, of binary tree 200. The number of random numbers will vary according to the number of levels present in binary tree 200. In FIG. 2, data block 203-3 is shown as an exemplary X value, and data block 203-4 is shown as an exemplary Y value. Substituting the corresponding values into Equation 1, the calculation to determine a value for hash 210-2 (the parent) is given by:

([203−3]+RND1*[203−4]) modulo P        Equation [2], where [203−3] represents a value (X) of data block 203-3, [203−4] represents a value (Y) of data block 203-4, RND1 is a random number for the second level, and P is a prime number.

In FIG. 2, the second level of binary tree 200 is comprised of hash 210-1 (a parent of data blocks 202-1, 202-2), hash 210-2 (a parent of data blocks 202-3, 202-4), hash 210-3 (a parent of data blocks 202-5, 202-6), and hash 210-m (a parent of data blocks 202-7, 202-n), where m=n/2, and in FIG. 2, m=4. The third level of binary tree 200 shown in FIG. 2 is comprised of hash 220-1 (a parent of hashes 210-1, 210-2), and hash 220-p (a parent of hashes 210-3, 210-p), where p=m/2, and in FIG. 2, p=2. The fourth level of binary tree 200 in FIG. 2 is a singular value, root hash 230 (a parent of hashes 220-1, 220-p). Thus, it will be evident that, regardless of the value for n, binary tree 200 may result in a single value for root hash 230. Root hash 230 may accordingly be calculated as data stream 130 arrives. In certain embodiments, root hash 230 may be stored as a successive list of root hash values that are indexed to a certain time or data index of data stream 130. A current value for root hash 230 may represent a current time or current index of data stream 130. It is noted that root hash 230 includes information for all levels of binary tree 200. Root hash 230 may be calculated by verifier 112 during single-pass processing of data stream 130 and may be stored as a first root hash value for comparing to a second root hash value determined using proof protocol 110, as will now be described in further detail.

Figure 3:
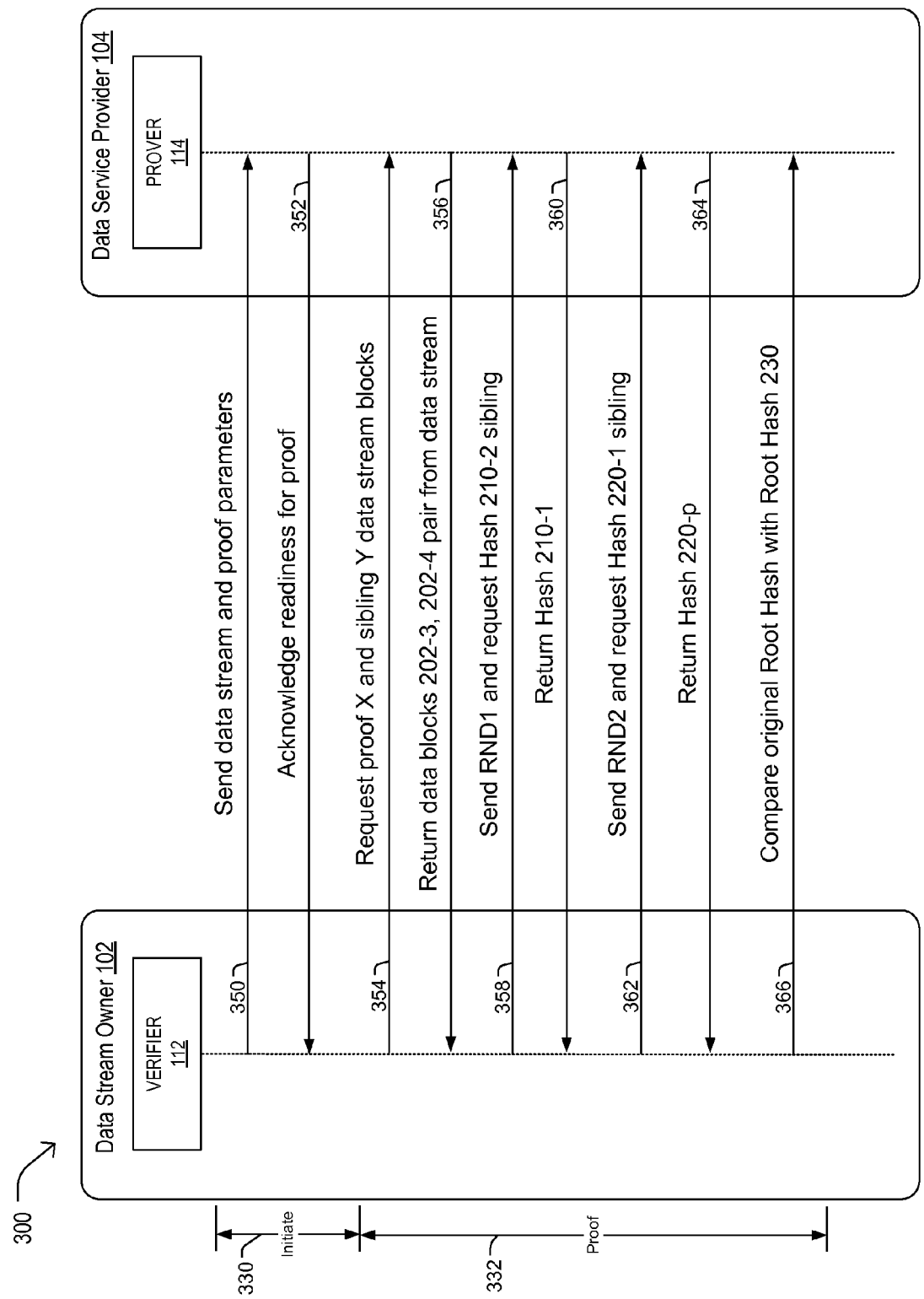
FIG. 3 is a block diagram of selected elements of an embodiment of a proof protocol.

Turning now to FIG. 3, a block diagram of selected elements of an embodiment of proof protocol 300 is shown. Proof protocol 300, which may represent an exemplary implementation of proof protocol 110 (see FIG. 1), as shown in FIG. 3 may be implemented based on binary tree 200 (see FIG. 2) in which n=8. Proof protocol 300 represents a communication protocol between verifier 112 (acting on behalf of data stream owner 102) and prover 114 (acting on behalf of data service provider 104), as discussed above with respect to FIG. 1.

In FIG. 3, initiate phase 330 may represent initial or configuration tasks associated with proof protocol 300. Verifier 112 may send a data stream and proof parameters to prover 114 (operation 350). The proof parameters may specify instructions executable by prover 114 to participate in proof phase 332 of proof protocol 300. The proof parameters may include a specific data query for a particular one or more data block(s) 202 (see FIG. 2). The proof parameters may include a value for P (see Equation 1). Prover 114 may respond by acknowledging readiness for starting the proof (operation 352). When prover 114 does not respond in operation 352, proof protocol 300 may stop and may not initiate proof phase 332.

Then proof phase 332, as shown in FIG. 3, of proof protocol 300 may commence. Verifier 112 may request a proof query specifying a data block X and a sibling data block Y, and request that prover 114 send the requested data blocks (operation 354). Prover 114 may then send, in response, data block 202-3 (X) and data block 202-4 (Y) from the data stream, as the requested sibling pair (operation 356). Verifier 112 may then send RND1 and request the sibling for hash 210-2 (operation 358). It is noted that prior to operation 358, RND1 was kept in confidence from prover 114, and that prover 114 receives RND1 only after providing data blocks 202-3, 202-4 to verifier 112. After operation 358, prover 114 may use RND1 to calculate hash 210-1. Then, prover 114 may return the value for hash 210-1 (operation 360). Upon receipt of hash 210-1, verifier 112 may calculate hash 220-1 using RND2, which has been kept confidential from prover 114. Verifier 112 may then send RND2 and request the sibling for hash 220-1 (operation 362). Prover 114 may then calculate hash 220-$p$ using RND2. Prover 114 may then respond by sending hash 220-$p$ (operation 364). Verifier 112 may then calculate root hash 230, which is a second value in addition to a first value (not shown in the figures) calculated originally from data stream 130. Verifier 112 may compare the first original value with root hash 230 and send the result of the comparison to prover 114 (operation 366). It is noted that in this manner, verifier 112 has obtained information depending on values for all current data blocks 202 used to generate binary tree 200. In certain embodiments, verifier 112 may use additional protocols to pinpoint which specific data blocks 202 have been incorrectly represented by prover 114.

Figure 4:
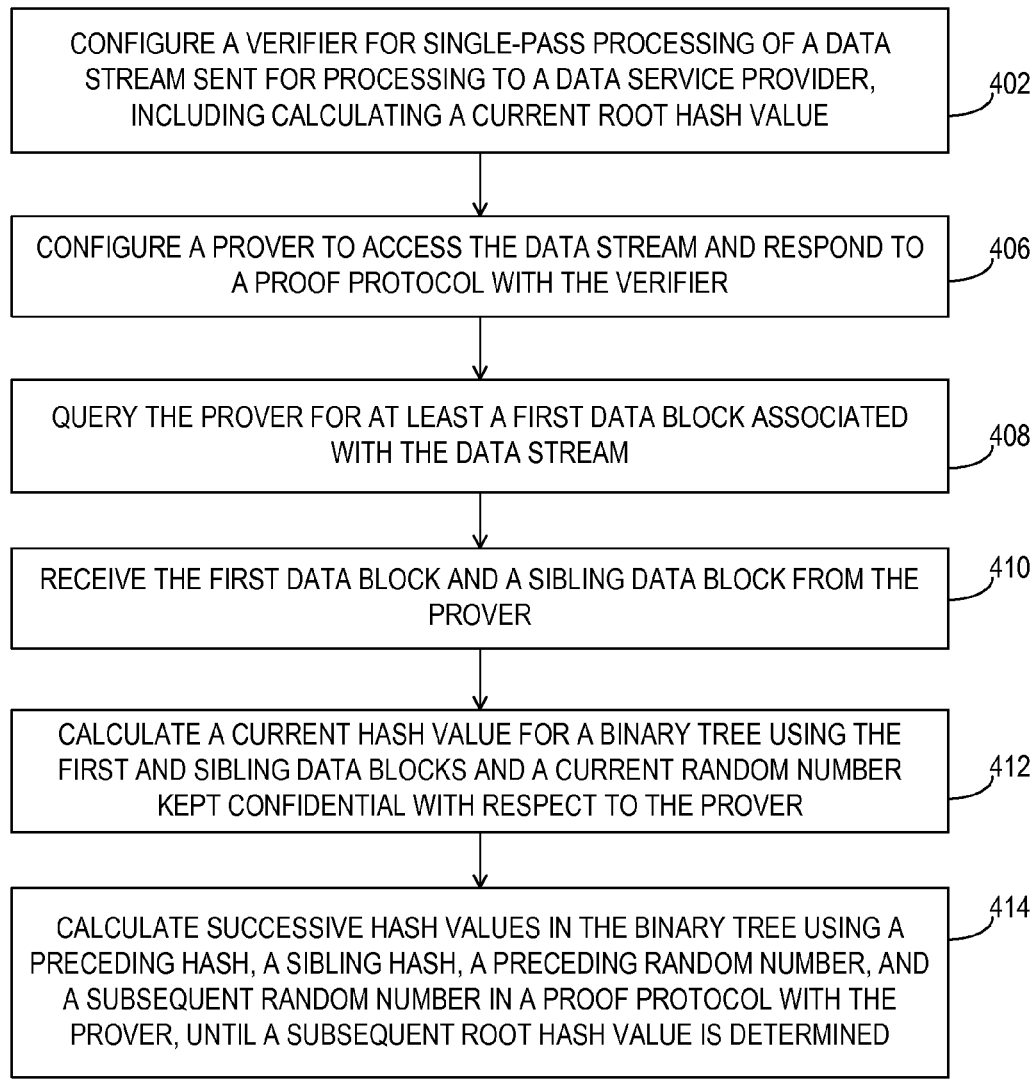
FIG. 4 is a block diagram of selected elements of an embodiment of a proof protocol.

Turning now to FIG. 4, an embodiment of method 400 for performing selected operations of a proof protocol is illustrated in flow chart form. Method 400 may represent an algorithm used in the context of streaming data processing system 100, or elements included therein (see also FIGS. 1-3). Method 400 may also involve functionality provided by proof protocol 110 executing on computing device 700 (see FIG. 7). It is noted that certain operations described in method 400 may be optional or may be rearranged in different embodiments.

Method 400 may begin by configuring (operation 402) a verifier for single-pass processing of a data stream sent for processing to a data service provider, including calculating a current root hash value. It is noted that verifier 112 may compute the current root hash value according to binary tree 200 (see FIG. 2) during single-pass processing of an original instance of data stream 130, since all values involved with binary tree 200 are known to verifier 112. Then, a prover may be configured (operation 406) to access the data stream and respond to a proof protocol with the verifier. The configuring of the prover may include specifying a binary tree of hash values associated with the data stream. The prover may access the data stream via single-pass processing or by accessing a streaming data warehouse (not shown in the figures) collecting the data stream. As noted previously, the streaming data warehouse may be operated by data service provider 104 on behalf of data owner 102. The prover may be queried (operation 408) for at least a first data block associated with the data stream. The verifier may send a query, such as a data stream query, to the prover in operation 408. Then, the first data block and a sibling data block may be received (operation 410) from the prover. The prover may query the data stream during operation 410 to provide the expected (i.e., correct) response for the value of the first data block and the sibling data block to the verifier. Next, a current hash value may be calculated (operation 412) for a binary tree using the first and sibling data blocks and a current random number. The verifier may keep the current random number confidential from the prover until operations 410 and/or 412 are completed. Then, successive hash values in the binary tree may be calculated (operation 414) using a preceding hash, a sibling hash, a preceding random number, and a subsequent random number in a proof protocol with the prover, until a subsequent root hash value is determined.

Figure 5:
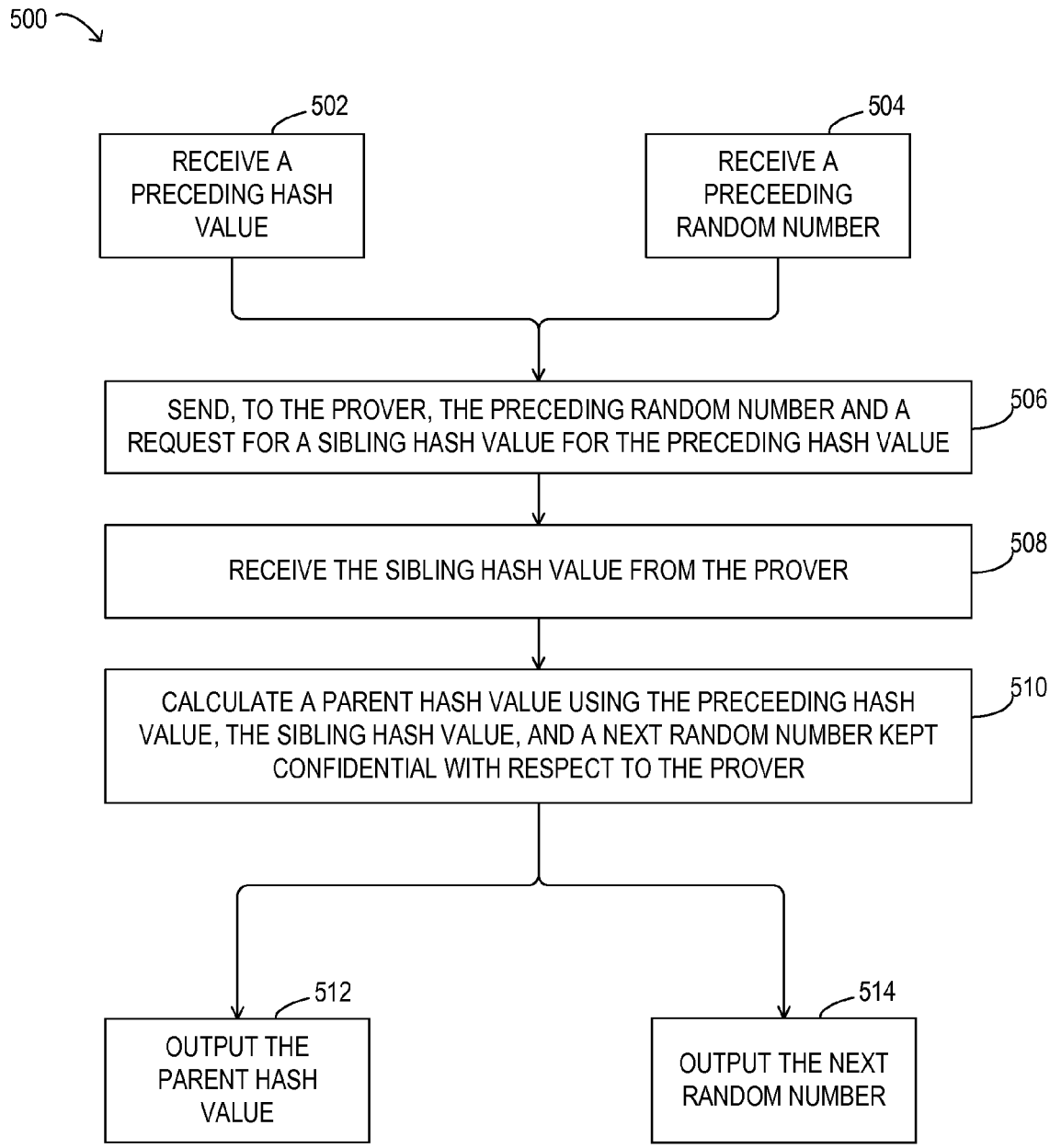
FIG. 5 is a block diagram of selected elements of an embodiment of a proof protocol.

Turning now to FIG. 5, an embodiment of method 500 for performing selected operations of a proof protocol is illustrated in flow chart form. Method 500 may represent an algorithm used in the context of streaming data processing system 100, or elements included therein (see also FIGS. 1-3). Method 500 may also involve functionality provided by proof protocol 110 executing on computing device 700 (see FIG. 7). It is noted that certain operations described in method 500 may be optional or may be rearranged in different embodiments. In certain embodiments, method 500 may represent an example of operations performed during operation 414 as described above with respect to FIG. 4 within the context of binary tree 200 (see FIG. 2). It is noted that method 500 may represent a functional algorithm that may be implemented recursively (or iteratively) for successive levels of binary tree 200.

Method 500 may begin by receiving (operation 502) a preceding hash value, and by receiving (operation 504) a preceding random number. The preceding hash value and the preceding random number may represent inputs to method 500. The preceding random number and a request for a sibling hash value for the preceding hash value may be sent (operation 506) to the prover. It is noted that, until operation 506 is performed, the preceding random number may be kept confidential from the prover. The sibling hash value may be received (operation 508) from the prover. A parent hash value may be calculated (operation 510) using the preceding hash value, the sibling hash value, and a next random number kept confidential with respect to the prover. Then, the parent hash value may be output (operation 512) and the next random number may be output (operation 514). The values output in one iteration of method 500 may be used as inputs in a successive iteration of method 500.

Figure 6:
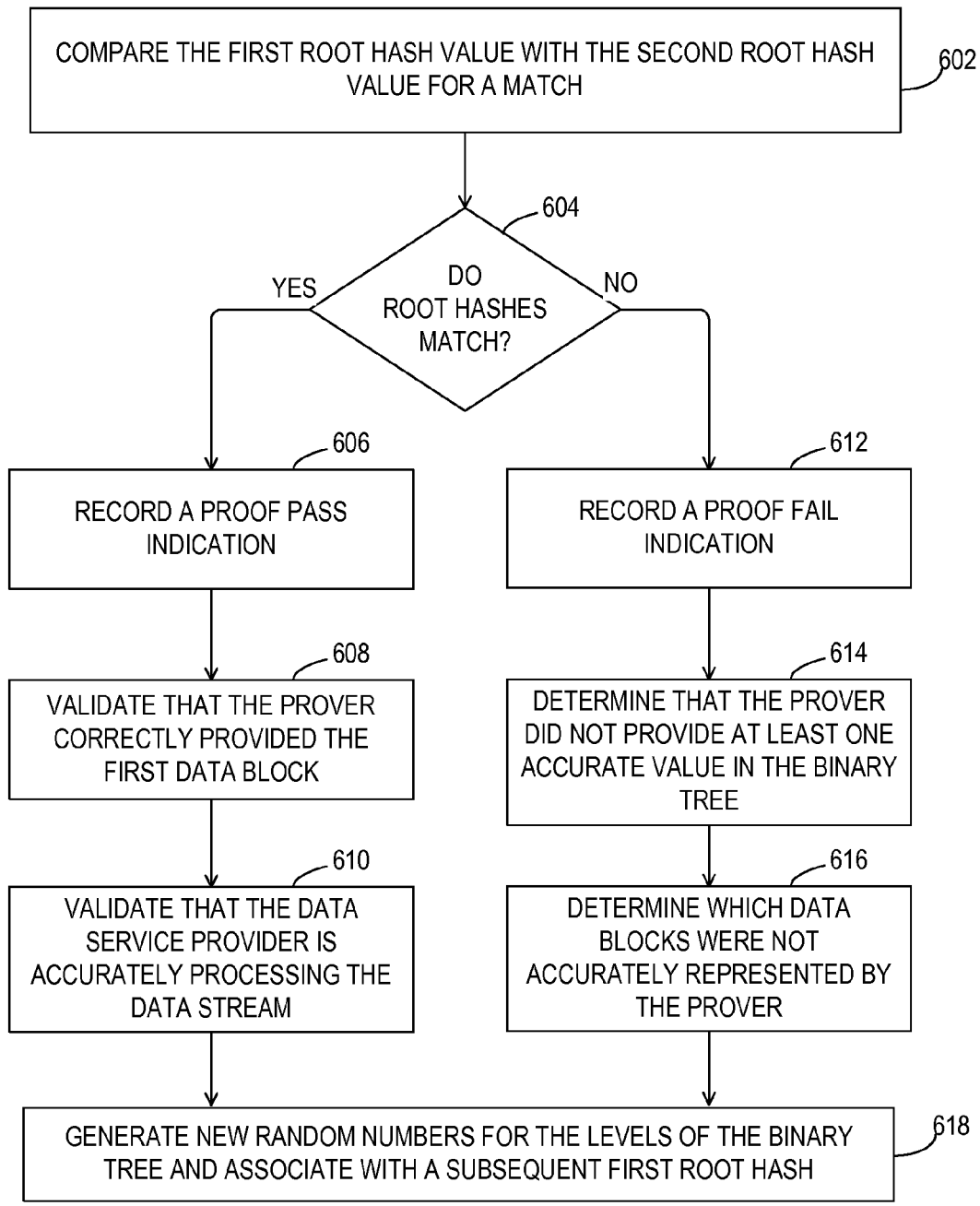
FIG. 6 is a block diagram of selected elements of an embodiment of a proof protocol.

Turning now to FIG. 6, an embodiment of method 600 performing selected operations of a proof protocol is illustrated in flow chart form. Method 600 may represent an algorithm used in the context of streaming data processing system 100, or elements included therein (see also FIGS. 1-3). Method 600 may also involve functionality provided by proof protocol 110 executing on computing device 700 (see FIG. 7). It is noted that certain operations described in method 600 may be optional or may be rearranged in different embodiments. In certain embodiments, method 500 may represent an example of operations performed after operation 414 as described above with respect to FIG. 4.

The first root hash value may be compared (operation 602) with the second root hash value for a match. Then, in method 600, a decision may be made whether the root hash values match (operation 604). When the result of operation 604 is YES, a proof pass indication may be recorded (operation 606). Then, method 600 may validate (operation 608) that the prover correctly provided the first data block (see operation 410 in FIG. 4). Method 600 may also validate (operation 610) that the data service provider is accurately processing the data stream. It is noted that the validations in operations 608 and 610 may be used as confirmations of service delivered by the data service provider and may provide a basis for authorizing billing and/or charging payments by the data service provider.

When the result of operation 604 is NO, then a proof fail indication may be recorded (operation 612). Method 600 may determine (operation 614) that the provider did not provide at least one accurate value in the binary tree. Method 600 may also determine (operation 616) which data blocks were not accurately represented by the prover.

After operation 610 or operation 616, new random numbers for the levels of the binary tree may be generated and associated (operation 618) with a subsequent first root hash. Operation 618 may be performed to keep random numbers used in the binary tree confidential from the prover.

Figure 7:
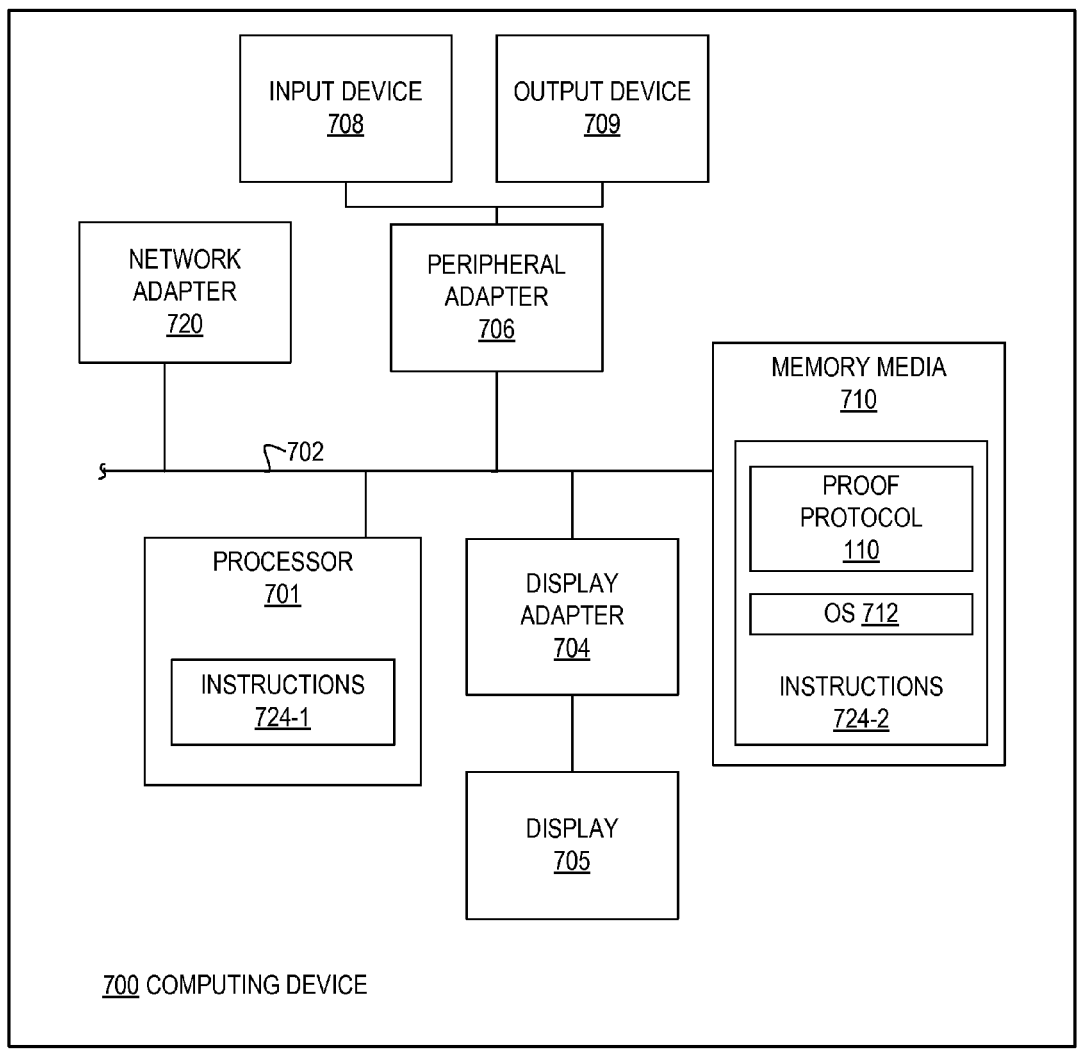
FIG. 7 is a block diagram of selected elements of an embodiment of a computing device.

Referring now to FIG. 7, a block diagram of selected elements of an embodiment of a computing device 700 for performing a proof protocol according to the present disclosure is illustrated. In various embodiments, computing device 700 may represent an implementation of verifier 112. In the embodiment depicted in FIG. 7, device 700 includes processor 701 coupled via shared bus 702 to storage media collectively identified as memory media 710.

Device 700, as depicted in FIG. 7, further includes network adapter 720 that interfaces device 700 to a network (not shown in FIG. 7). In embodiments suitable for use in database systems, device 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

Device 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as video graphics array, extended graphics array, etc., or digital standards such as digital visual interface, definition multimedia interface, among others. A television display may comply with standards such as National Television System Committee, Phase Alternating Line, or another suitable standard. Display 705 may include an output device 709, such as one or more integrated speakers to play audio content, or may include an input device 708, such as a microphone or video camera.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712 and proof protocol 110. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. In some embodiments, memory media 710 is configured to store and provide executable instructions for executing proof protocol 110, as mentioned previously. For example, proof protocol 110 may be configured to execute proof protocol 300, method 400, method 500 and/or method 600. In certain embodiments, computing device 700 may represent an implementation of verifier 112 and/or data stream owner 102 (see FIG. 1), or a combination thereof. In various embodiments, network adapter 720 may be used to access prover 114 (see FIG. 3).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for analyzing a data stream, the method comprising:
  receiving, from a prover configured to process the data stream, a first data block and a sibling data block, wherein the first data block and the sibling data block are associated with a first level of a binary tree of hash values;
  calculating a current hash value using the first data block, the sibling data block, and a first random number; and
  processing a next level in the binary tree of hash values, wherein the processing of the next level in the binary tree of hash values comprises:
  sending, to the prover, a current random number and a request for a sibling hash value, wherein the sibling hash value is a sibling of the current hash value;
  receiving the sibling hash value;
  determining a subsequent random number; and
  calculating a subsequent hash value using the current hash value, the sibling hash value, and the subsequent random number,
  wherein a hash value for a sibling pair X and Y is given by $(X+R*Y)$ modulo P,
  where R is a random variable and P is a prime number.

2. The method of claim 1, further comprising:
  determining a calculated root hash value for the binary tree of hash values by:
  recursively performing the processing for a number of successive levels in the binary tree of hash values, wherein in each iteration of the processing:
  the current hash value is replaced with a parent hash value; and
  the number of successive levels is dependent on a number of data sources associated with the data stream.

3. The method of claim 2, further comprising:
  comparing the calculated root hash value and a previously stored root hash value;
  determining a match between the calculated root hash value and the previously stored root hash value; and
  validating the data stream in response.

4. The method of claim 3, further comprising invalidating the data stream when the calculated root hash value fails to match the previously stored root hash value.

5. The method of claim 1, further comprising sending a query to the prover to provide the first data block.

6. The method of claim 5, wherein sending the query to the prover comprises sending a query selected from the group of data stream queries consisting of index, predecessor, dictionary, range, range-sum, self join size, frequency moment, and inner product.

7. A system for validating a data stream, comprising:
  a processor; and
  memory storing instructions that when executed cause the processor to perform operations, the operations comprising:
  storing a first root hash for the data stream, wherein the first root hash corresponds to a number of levels in a binary tree;
  calculating a second root hash for the data stream using a proof protocol and a prover associated with a data service provider receiving the data stream;

receiving, from the prover, a first data block in the binary tree and a second data block that is a sibling of the first data block;

calculating a first hash value using the first data block, the second data block, and a first random number that is kept confidential with respect to the prover;

after calculating the first hash value, calculating a hash value for a next level in the binary tree;

sending, to the prover, a random number used to calculate a ing hash value and a request for a sibling hash value;

receive the sibling hash value from the prover; and calculating a parent hash value using the previous hash value, the sibling hash value, and a next random number that is kept confidential with respect to the prover; and recursively performing the calculating of the hash value for the next level for successive levels in the binary tree, using a preceding parent hash value as the previous hash value and a new random number as the next random number, until the second root hash for the binary tree is obtained; and]

determining whether the first root hash matches the second root hash, wherein a hash value for a sibling pair X and Y is given by (X+R*Y) modulo P, where R is a random variable and P is a prime number.

8. The system of claim 7, wherein the memory media further include instructions executable by the processor to operations further comprise validating the data service provider is accurately processing the data stream in response to the first root hash matching the second root hash.

9. The system of claim 7, wherein the operations further comprise returning a failure of the proof protocol in response to the first root hash failing to match the second root hash.

10. The system of claim 7, wherein the number of levels in the binary tree depends on a number of data sources associated with the data stream.

11. The system of claim 1, wherein the range for R and a value for P are selected based on a desired degree of security for the proof protocol.

12. A memory storing instructions that when executed cause a processor to perform operations, the operations comprising:

storing a first root hash value for the data stream, wherein the first root hash value is derived based on a number of levels in a binary tree;

calculating a second root hash value for the data stream using a proof protocol and a prover associated with the data service provider;

receiving, from the prover, a first data block in the binary tree and a second data block that is a sibling of the first data block;

calculating a first hash value using the first data block, the second data block, and a first random number that is kept confidential with respect to the prover;

after calculating the first hash value, processing a next level in the binary tree by:

sending, to the prover, a random number used to calculate a current hash value;

receiving a sibling hash value from the prover; and calculating a parent hash value using the current hash value, the sibling hash value, and a next random number that is kept confidential with respect to the prover; and recursively performing the processing the next level in the binary tree for successive levels in the binary tree, using a preceding parent hash value as the current hash value and a new random number as the next random number, until the second root hash value for the binary tree is obtained, wherein a hash value for a sibling pair X and Y is given by (X+R*Y) modulo P, where R is a random variable and P is a prime number.

13. The memory of claim 12, wherein the operations further comprise determining whether the first root hash value matches the second root hash value.

14. The memory of claim 13, further comprising instructions executable to wherein the operations further comprise validating the prover in response to the first root hash value matching the second root hash value.

15. The memory of claim 12, wherein the operations further comprise sending an indication of the proof protocol to the prover.

16. The memory of claim 12, wherein the operations further comprise:

after executing the proof protocol, generating new random numbers for calculating the first root hash value for respective levels in the binary tree; and recording an indication of the random numbers associated with the first root hash value for use in subsequent iterations of the proof protocol.

17. The memory of claim 12, wherein the number of levels in the binary tree depends on a number of data sources associated with the data stream.

* * * * *